June 13, 1944.  W. H. SILVER  2,351,078
LISTER
Filed Sept. 12, 1940  5 Sheets-Sheet 3

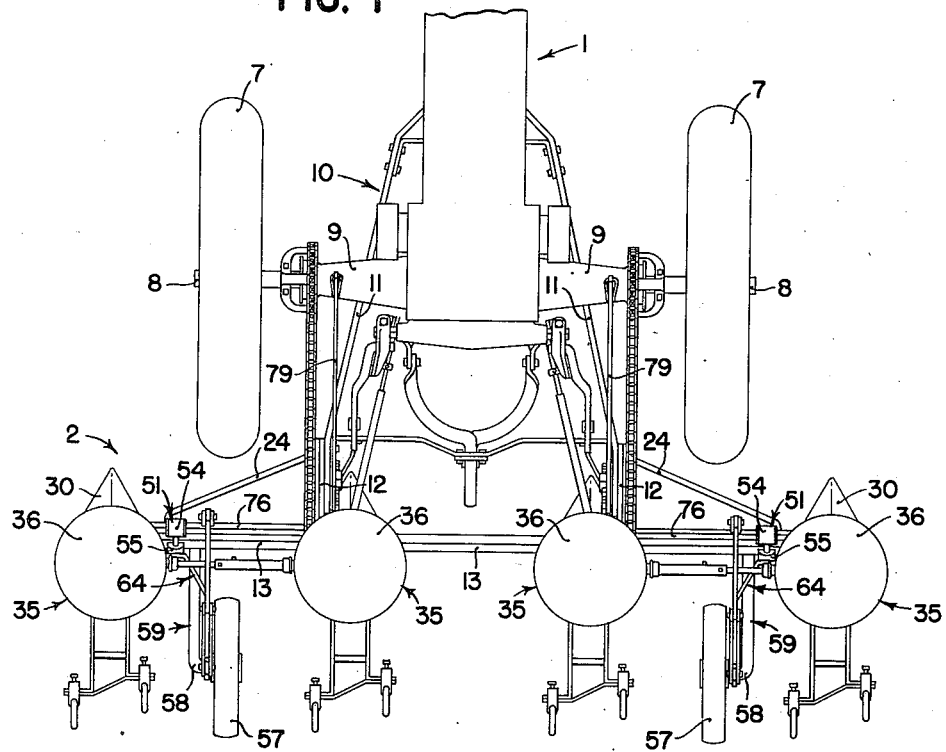
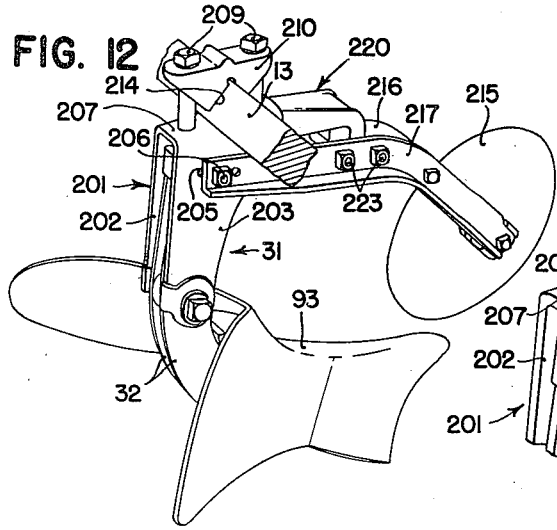
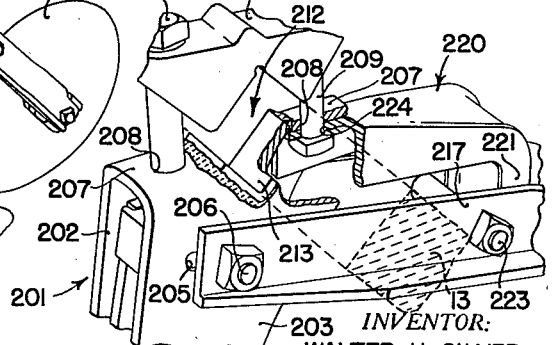

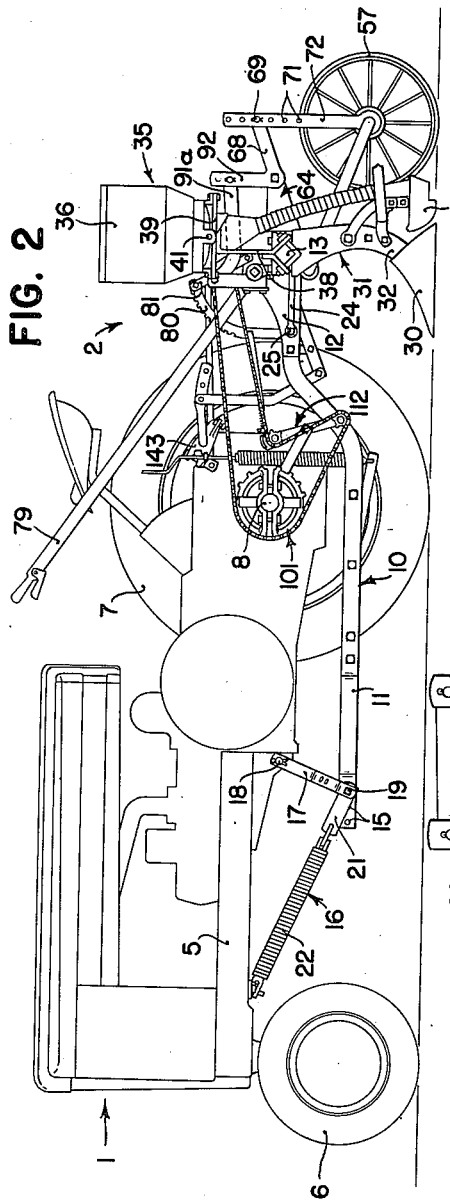
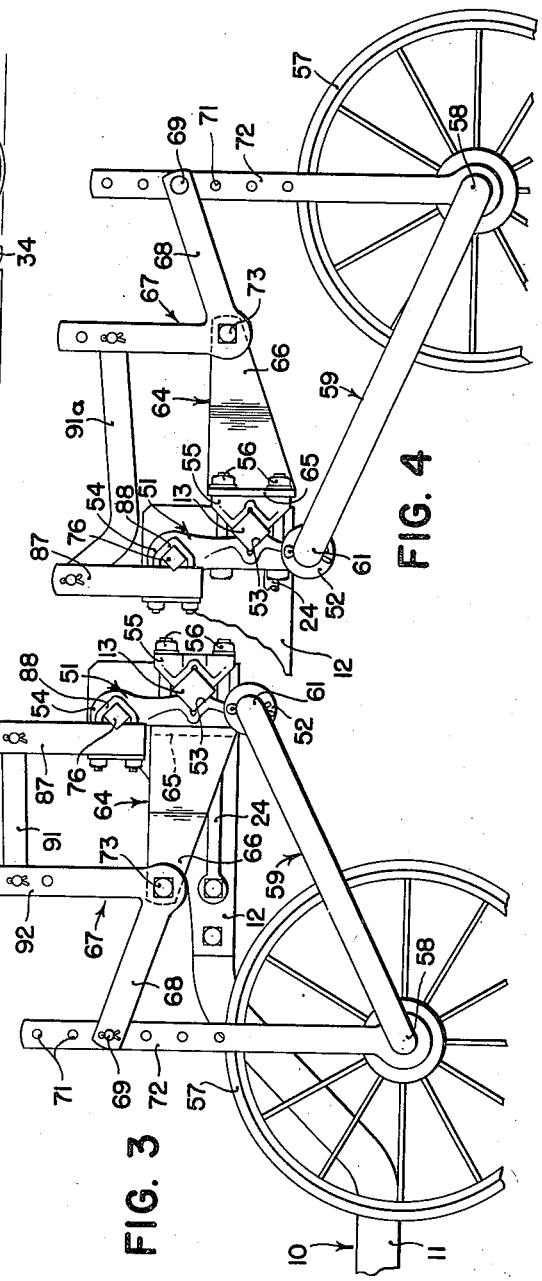

INVENTOR:
WALTER H. SILVER
BY
ATTORNEYS.

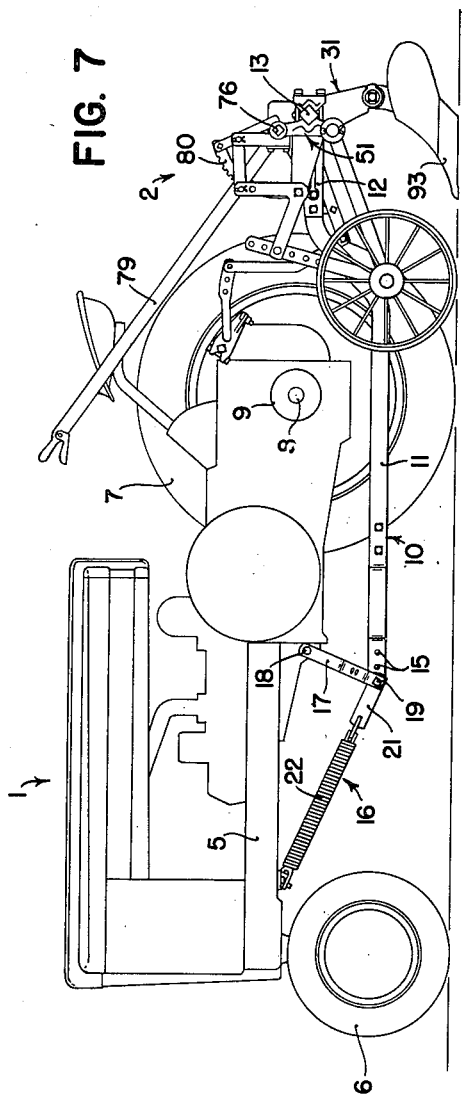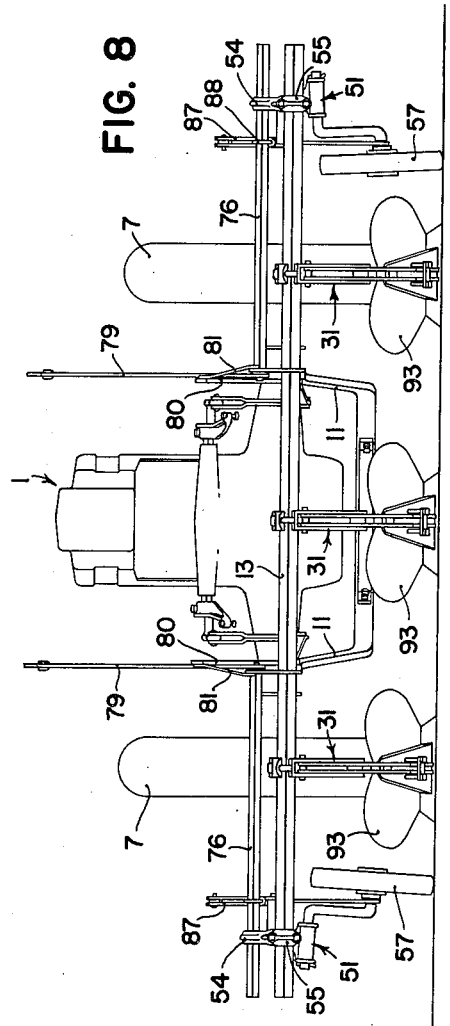

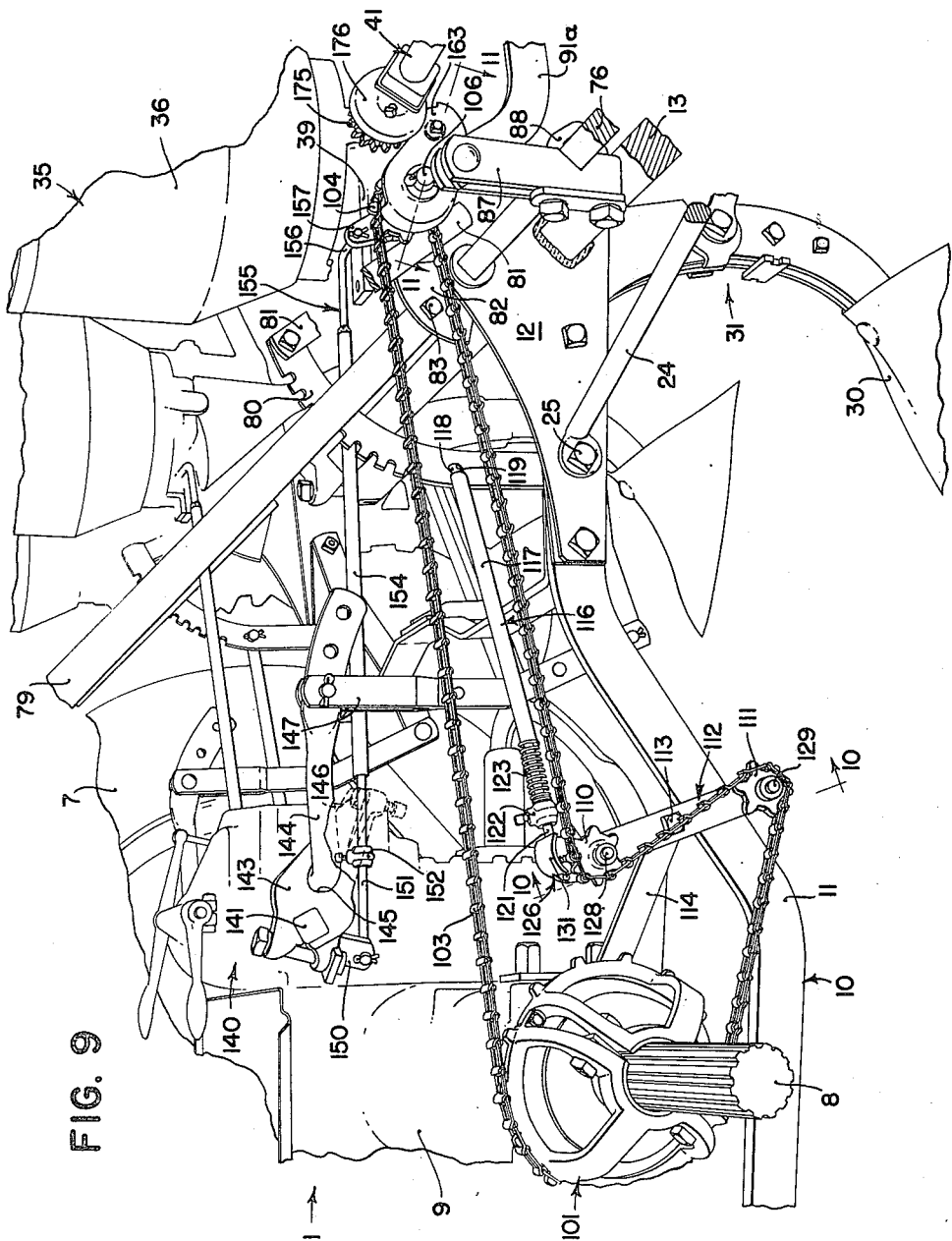

Patented June 13, 1944

2,351,078

UNITED STATES PATENT OFFICE 2,351,078

LISTER

Walter H. Silver, Moline, Ill., assignor to Deere & Company, Moline, Ill., a corporation of Illinois Application September 12, 1940, Serial No. 356,433

22 Claims. (Cl. 111—59)

This invention relates generally to agricultural implements and more particularly to listers and bedders of the type adapted to receive a plurality of tools of different kinds and arranged in different ways to accommodate various conditions of operation.

Generally speaking, a lister or bedder of the tractor-mounted or integral type, with which the present invention is more particularly concerned, comprises a frame connected at its forward end with the tractor for generally vertical swinging movement and having a rear transverse tool bar to which the desired tools at the desired spacing are connected, together with gauge wheel means for gauging the depth of operation of the tool or tools. Usually, such implements may be arranged to serve as a two-row, three-row, or four-row machine and may receive tools for forming trenches or furrows, or for either splitting or sweeping off the tops of previously formed beds or ridges, either previous to or simultaneously with planting operations, as desired.

The object and general nature of this invention is the provision of driving and controlling connections between the tractor and the implement, and improved means for connecting and operating the gauge wheels so that at a minimum expenditure of time and energy the implement may be arranged to do the work desired under the conditions to be encountered. More specifically, it is a feature of this invention to provide a frame construction which may be connected or hitched to the tractor at a plurality of points longitudinally thereof, with driving and controlling connections between the implement and the tractor particularly constructed and arranged to accommodate disposing the implement in any one of a plurality of positions relative to the tractor.

For example, for best operation it is desired to have the tools placed as close as possible up to the rear end of the tractor, not only to secure more uniform operation but also to reduce the energy required to lift the implement up into its transport position. On the other hand, the tools should not be placed so as to interfere with the action of the rear wheels of the tractor. Thus, when the number of tools employed is such that they may be placed, not directly rearwardly of the rear tractor wheels, but at one side thereof, the implement frame may be disposed farther forward, relative to the tractor, than would be practical if the number of tools is such that one or two of them are disposed directly rearwardly of the rear wheels.

A further feature of this invention resides in the provision of longitudinally adjustable gauge wheels. It is desirable to have the gauge wheels operate as close as possible to the tools whose operation they gauge, and in some conditions this requires that the gauge wheels be disposed forward of the tools, but in other conditions the gauge wheels preferably are disposed rearwardly of the tools. For example, when lister bottoms or furrow openers of the moldboard type are employed, it is desirable to have the gauge wheels in their forward position and arranged so as not to run on the freshly turned soil. On the other hand, when sweeping off the top soil of the beds, or in similar operations, it would not be desirable to have the gauge wheels run on the loose top of the beds, and therefore it is generally preferable to have the gauge wheels disposed rearwardly and spaced to run in the rear wheel tracks.

Another feature of this invention, particularly concerned with an agricultural machine in which the frame is movable to different positions longitudinally of the tractor, is the provision of driving connections between the implement-carried planting units and a driving part on the tractor, such as the driving sprocket on one or both of the rear axle shafts, which driving connections are arranged to accommodate movement of the implement frame longitudinally of the tractor. Specifically, it is a feature of this invention to provide a driving sprocket and chain mechanism which includes means for automatically adjusting the effective length of the chain according to the position of the implement frame relative to the tractor. Specifically, the present invention contemplates the provision of a rocking member, that tightens or loosens the driving chain and which is rocked by connections with the tractor and implement, respectively. Further, it is a feature of this invention to provide throw-out means for disengaging the driving connection whenever the implement frame is raised into its inoperative or transport position, said throw-out means being particularly constructed and arranged to accommodate the aforesaid relative movement of the frame with respect to the tractor.

A further and specific feature of this invention is the provision of operating connections associated with the gauge wheels by which the height of the implement frame relative to the ground may be controlled, said means including a hand-controlled bell crank mounted on a part of the implement frame that extends forwardly so as to dispose the bell crank substantially directly above the portion of the gauge wheel crank axle with which it is connected, and further it is an additional feature of this invention to provide said bell crank mounting so that it may be arranged to accommodate the aforesaid optional disposition of the gauge wheels, namely fore or aft with respect to the transverse tool-carrying bar.

Another feature of this invention is the provision of new and improved coulter supporting means especially constructed to accommodate adjustable tools.

Thus, by virtue of the features of the present invention, a lister and bedder is provided which may be quickly, easily, and efficiently adaptable to many tillage jobs and further, with the addition of planting units, may be readily changed from a tillage implement to a planting implement.

These and other objects and advantages of the present invention will be apparent to those skilled in the art after a consideration of the following detailed description, taken in conjunction with the accompanying drawings illustrating the preferred form of the invention.

In the drawings:

Figure 1 is a plan view of an implement incorporating the principles of the present invention and arranged as a four-row planter employing tools in the form of sweeps with gauge wheels arranged in a rear position and spaced to run in the rear wheel tracks;

Figure 2 is a side view of the implement shown in Figure 1;

Figures 3 and 4 are detail side views of the gauge wheel construction, showing the two fore and aft positions of the gauge wheels;

Figure 7 is a side view, similar to Figure 2, showing the position of the frame relative to the tractor when employing lister furrow openers of the moldboard type, with the implement frame in a position so that there is no interference between the rear wheels of the tractor and the lister bottoms;

Figure 8 is a rear view, looking forwardly, of the machine shown in Figure 7;

Figure 9 is a fragmentary side view, showing the details of the driving connection between one of the planting units and the adjacent rear wheel axle shaft of the tractor, and the controlling throw-out connections therefor;

Figure 12 is a perspective view of a rolling coulter adapted to be used with the implement shown in Figure 1; and Figure 13 is a fragmentary view, showing the support for the coulter arms.

Figure 6:
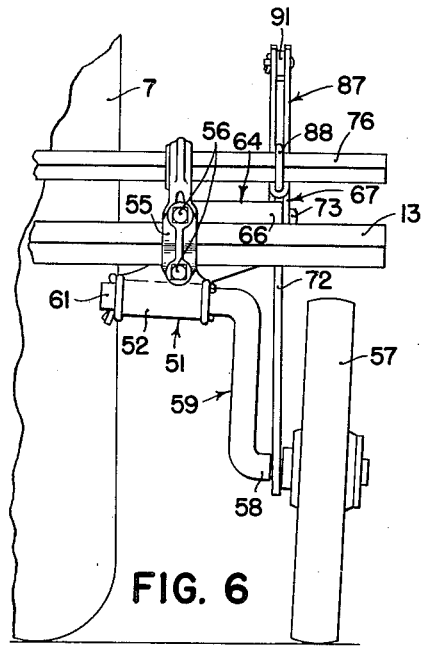
Figure 6 is a view similar to Figure 5 but shows the manner of attaching the gauge wheels to secure a wide spacing.

Referring now to the drawings, particularly Figures 1 and 2, the reference numeral 1 indicates the tractor and the reference numeral 2 indicates the implement. The tractor 1 is of more or less conventional construction, comprising means serving as a frame, indicated at 5, supported on front steering wheels 6 and rear traction wheels 7. The latter are mounted on axle shafts 8 for lateral adjustment so as to vary the tread of the tractor. The rear axle housing of the tractor is indicated by the reference numeral 9, and includes lateral extensions in which the axle shafts 8 are journaled for rotation.

The implement 2 comprises frame 10 which includes a pair of generally longitudinally extending beams 11 which at their rear ends are bolted or otherwise secured to plates 12 which are welded in laterally spaced relation to a rear transverse tool bar 13, the latter preferably extending laterally outwardly beyond and in rear of the rear tractor wheels 7. The beams 11 converge forwardly and at the forward ends are connected together and have a plurality of apertures, as indicated at 15. The implement frame 10 is conneced with the forward portion of the tractor by a hitch 16 that comprises a yoke 17 pivoted, as at 18, to the tractor and at its lower end carries a pivot bolt 19 which is disposed in one of the several frame openings 15. A pair of links 21 are also connected at the rear ends to the pivot bolts 19 and at the forward ends are connected to one or more cushioning springs 22. The latter are connected at the forward ends to the front end of the tractor, as shown on Figure 2. The cushioning springs 22 not only cushion the load but also serve as a safety device to prevent the tractor and the implement from breakage when field obstructions are encountered, the entire implement frame shifting generally rearwardly when the springs 22 yield.

The connection between the frame plates 12 and the tool bar 13 is reenforced by a pair of braces 24, the laterally inner ends of the braces being secured, by a bolt 25, to the forward part of the associated plate 12 while the laterally outer ends of the braces 24 are connected with the transverse tool bar 13, preferably by welding or the like.

Figures 1 and 2 show the implement arranged as a four-row sweep planter, in which case the two sweeps at each side of the machine are disposed substantially equal distances on opposite sides of the tractor wheels, and the implement frame can therefore be disposed in a forward position, such as by inserting the pivot bolt 19 in the rear hole 15 at the forward ends of the tool beams 11. This disposes the implement frame 10 in a forward position but with adequate clearance between the rear tractor wheels 7 and the frame. Also, since sweeps are being used, the gauge wheels may be arranged to occupy a rear position, running in the bottoms of the furrows behind the rear wheels and between the beds worked by the sweeps.

Referring now more particularly to Figures 1 to 4, inclusive, the tool beam 13 is preferably square in cross-section and uniform in cross-section so that the parts adapted to be attached thereto may be disposed in any one of a plurality of lateral positions. When four tools are provided to afford four-row operation, the laterally outer tools are fixed adjacent the outer ends of tool bar while the two inner tools are fixed to the tool bar just inside the attaching plates 12. The sweeps shown in Figures 1 and 2 are each indicated by the reference numeral 30 and are fixed, respectively, to the lower ends of beams or standards 31, each of the latter including foot pieces 32 adapted to receive different sizes and types of ground working tools. As mentioned above, sweeps, such as are shown at 30 in Figures 1 and 2, are commonly employed for sweeping off the tops of previously formed beds to accommodate a subsequent planting operation, or, as shown in Figures 1 and 2, the planting may be done at the same time sweeps are used for sweeping off the tops of the beds or ridges. To this end furrow openers 34 and seeding units 35 may be supported on the tool bar 13. The seeding units 35 are more or less of conventional construction and hence extended description will be unnecessary. Briefly, each unit includes a seed container 36 having in the lower portion thereof conventional seed selecting and feeding mechanism, the whole being supported upon a standard 38 on which a plate or base 39 is fixed. The seeding mechanism is driven by a transverse seeding shaft 41, there being one shaft 41 at each side of a four-row implement, with each shaft driving two units and in turn being driven from the axle shaft at that side of the tractor, as will be explained in detail below.

It will be observed that the implement frame 10 as a whole is supported for floating movement relative to the tractor and is connected with the latter at a pivot point 19 accommodating the vertical swinging movement of the implement relative to the tractor. It is usual for implements of this kind to provide ground-engaging gauge means for insuring that the tools will always run at the proper depth, and in view of the fact, that, according to the present invention, various sizes and types of equipment may be utilized, the present invention contemplates a new and improved form of gauging means and control means therefor whereby the gauge wheels or other ground-engaging elements may be disposed in any one of several different positions so as to make it possible conveniently and easily to arrange the gauge wheels to accommodate the particular tools employed.

Referring now more particularly to Figures 1, 2, 3, and 4, a bracket casting 51 is disposed adjacent each laterally outer end of the tool bar 13 and is provided at its lower end with a transverse sleeve section 52, an intermediate bar receiving notch 53, and an upper bearing section 54. For clamping the bracket casting 51 in place, I provide a cap 55 and a pair of clamping bolts 56 which, when tightened, secure the casting 51 firmly and rigidly to the tool bar 13. Each gauge wheel is indicated by the reference numeral 57 and is mounted on the laterally bent end 58 of the gauge wheel crank axle that is indicated in its entirety by the reference numeral 59. The upper end 61 of the latter is bent in the opposite direction and is journaled for rocking movement in the sleeve section 52 of the bracket 51 associated therewith. Any suitable means, such as cotter keys or the like, may be provided for retaining the gauge wheel crank axle 59 against lateral displacement relative to the associated supporting bracket member. Likewise, any suitable means may be provided for holding the wheel 57 in proper position on the wheel receiving section 58 of the crank axle. The sleeve section 52 of the bracket 51 is not exactly parallel with the tool bar 13 when the bracket casting is clamped in place; instead, the sleeve section 52 has a slight angular displacement so as to provide the proper tilt or camber for the associated gauge wheel 57. It will be noted that the sleeve section 52 is disposed well below the bar 13 so that, as best shown in Figures 3 and 4, the gauge wheel crank axle 59 may occupy either a forwardly extending position or a rearwardly extending position, as desired, with ample clearance between the crank axle and the bar 13.

A bell crank supporting bracket, indicated in its entirety by the reference numeral 64, is provided with a laterally extending attaching section 65 which is apertured to receive the clamping bolts 56, whereby the bracket 64 may be clamped to the tool bar 13 along with the gauge wheel crank axle supporting casting 51. A bracket 64 is bent laterally and forwardly and terminates in a bell crank receiving section 66 which is apertured to pivotally support the bell crank 67. On arm 68 of the latter extends generally in a fore and aft direction and carries a pin 69 which is adapted to be disposed in any one of a plurality of apertures 71 formed in the upper end of a generally vertically extending link 72. The lower end of the latter is provided with an enlarged opening so as to receive the gauge wheel supporting section 58 of the crank axle 59. The bell crank is pivoted at 73.

As best illustrated in Figures 3 and 4, and as mentioned above, the gauge wheel crank axles 59 may be arranged to extend either generally forwardly or generally rearwardly, as desired, optionally disposing the associated gauge wheel 57 either in front of or in rear of the tool bar 13. Since the gauge wheels 57 determine the operating depth of the tools, suitable adjusting means, which will be described below, is associated with the bell cranks 67 and arranged to raise or lower the gauge wheel crank axles 59 relative to the implement frame 10. Therefore, it is necessary to arrange the bell crank supporting bracket 64 in a rearward position when the gauge wheel is disposed in its rearward position, and to arrange the bell crank supporting bracket 64 in a forward position when the gauge wheel crank axle 59 extends forwardly. This is conveniently accomplished since each of the brackets 64 are apertured to fit on the clamping bolts 56. Therefore, the brackets 64 may be clamped either to the main body of the gauge wheel supporting casting 51 or to the cap 55. In Figures 1, 2, and 4, the gauge wheels are shown as disposed in their rearward position, and hence to accommodate this arrangement the brackets 64 are shown as clamped to the caps 55, while in Figure 3 the gauge wheels are shown as in their forward position, in which case the brackets 64 are shown as bolted to the gauge wheel crank axle supporting castings 51. The castings 51 always remain on the forward side of the tool bar 13, and, as best shown in Figure 1, the brackets 64 are bent laterally so as to dispose the end 66 thereof substantially above the gauge wheel receiving section 58 of the crank axle, thereby providing for the disposition of the bell crank 67 substantially directly above the wheel receiving part of the crank axle. As best shown in Figure 2, each of the brackets 64 is formed so that the end 66 is disposed above the horizontal centerline of the attaching section 65, and therefore when changing the position of the gauge wheels from one side of the tool bar to the other, it is necessary to interchange the right and left hand brackets 64 for moving them from one side to the other of the tool bar 13 in order to have the end 66 of each bracket disposed in the proper positions, both fore and aft of the tool bar, while yet maintaining the outer end 66 of each bracket 64 substantially directly above the outer end of the associated crank axle.

Suitable depth-adjusting means is provided on the implement frame 10 for raising or lowering the gauge wheels to thereby adjust the depth of operation of the tools connected with the tool bar 13 of the frame 10, and according to the present invention such depth-adjusting and controlling means are particularly designed to accommodate the optional disposition of the gauge wheels and bell crank supporting brackets. At each side of the machine a rock shaft 76 is supported by any suitable means in the bearing section 54 of the crank axle supporting casting 51 at that side of the implement frame. Preferably the rock shaft 76 is supported for sliding movement relative to the bearing section 54, whereby the casting 51 may be shifted laterally along the tool bar 13 and along the rock shaft 76. The laterally inner end of the latter is supported for rocking movement by any suitable means in the upper portion of the associated frame plate 12, said means generally being arranged to limit or prevent actual movement of the rock shaft 76 relative to the frame plates 12. For rocking the rock shaft 76 I provide a hand lever 79 movable relative to a sector 80 which, at one end, is fastened to the associated frame bar 11 by the bolt 25 that fastens the frame base 24. The other end of the sector 80 is connected by a strap 81 to the plate 12. The hand lever 79 preferably is fixed to a segmental plate 82 in any one of several positions, the plate 82 being welded or otherwise non-rotatably connected with the rock shaft 76 and the hand lever being bolted, as at 83, to the plate 82 in any one of a plurality of positions relative thereto. The hand lever 79 carries conventional detent mechanism which cooperates with the sector 80 to lock the lever 79 thereto. An arm 87 is clamped by a U-bolt 88 or the like to the rock shaft 76 generally in the vertical longitudinal plane that extends through the outer end 66 of the associated bell crank supporting bracket 64. A link 91, which is relatively short, as shown in Figures 1-3, is pivoted to the outer end of the arm 87 and at the other end is pivoted to the other arm 92 of the associated bell crank 67. By virtue of this construction, when the hand lever 79 is released from its sector 80, swinging movement of the hand lever 79 rocks the arm 87 and acts through the link 91 to swing the bell crank 67, thus raising or lowering the gauge wheel associated therewith.

Due to the fact that the sleeve section 52 of the crank axle supporting casting 51 is not disposed directly underneath the tool bar 13, but slightly forwardly thereof, the same link 91 cannot be used in both positions of the gauge wheels and brackets 64. When the brackets 64 and gauge wheels 57 are disposed in their forward position as shown in Figure 3, the relatively short links 91 may be used, but when the brackets 64 and the gauge wheels 57 are in their rearward position, as shown in Figure 4, somewhat longer links 91a are used in place of the relatively short links 91. It will be seen, particularly from Figure 4, that the relatively longer links 91a are bent or curved so that they may pass underneath the associated seeding shaft 41. With the exception of the links 91, 91a the same parts of the gauge wheel and adjusting mechanisms are used, irrespective of whether the gauge wheels are disposed fore or aft of the tool bar 13.

Figure 5:
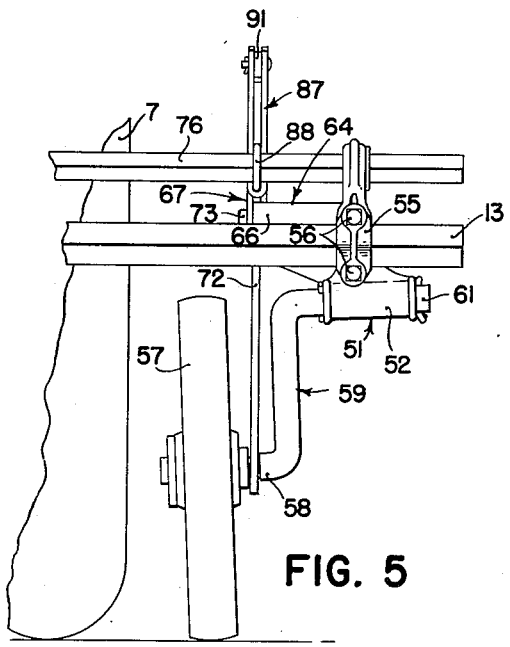
Figure 5 is a fragmentary rear view, looking forwardly, of the gauge wheel supporting means, with the gauge wheel disposed in a forward position and in its narrow setting, i. e., relatively close to the adjacent tractor wheel.

Figures 3 to 5 show the gauge wheels 57 in what is termed their narrow setting; that is, the gauge wheel crank axles 59 are mounted in the associated sleeve sections 52 so that the wheel receiving section 58 extends generally laterally inwardly and disposes the associated gauge wheel 57 in a laterally inward position relative to the associated casting 51. It may be desired to arrange the gauge wheels in their wide setting so as to secure a lateral spacing between the gauge wheels greater than may conveniently be secured when the gauge wheels are connected with the associated supporting castings as shown in Figures 1-4.

Referring now to Figure 6, it will be seen that to place the gauge wheels in their wide setting, all that it is necessary to do is to interchange the right and left hand castings 51 so that the normally right hand casting, when the gauge wheels are in their narrow setting, is disposed at the left end of the tool bar 13, and the normally left hand casting 51, when the gauge wheels are in their narrow setting, is at the right hand end of the tool bar 13. The castings 51 are always bolted at the right of the tool bar 13. By virtue of this arrangement, the correct pitch in the wheels is maintained with any wheel setting, thereby reducing end pressure and avoiding wear on the gauge wheel boxes. When gauge wheels are to be used in the wide setting, the gauge wheel crank axles are inserted through the bearing sleeve section 52 from the outer side, rather than from the inner side as when the wheels are used in their narrow setting. In both Figures 5 and 6, the gauge wheel illustrated is shown in a forward position, but it is to be understood that the wheel could be swung rearwardly into its rearward position, merely by changing the bell crank brackets 64 as described above.

Mention above was made of the fact that when, as shown in Figures 1 and 2, the number of tools utilized is such that they may be placed at the sides of the adjacent tractor wheels, the frame 10 may be disposed in its forwardmost position (see Figure 2). However, when the number of tools employed is such that a tool is disposed directly rearwardly of each rear wheel, then it may be desirable to attach the implement frame in its rearmost position. This is shown in Figures 7 and 8, which show three lister bottoms attached to the tool bar 13. The lister bottoms are indicated by the reference numeral 93 and are of the moldboard type. The bottoms 93 are attached to the foot pieces 32 of the beams 31 in the same manner as the sweeps 30 described above. As best shown in Figure 8, it will be seen that there is a lister bottom directly behind each rear tractor wheel 7, and it is for the purpose of securing adequate clearance between the wheel 7 and the adjacent lister bottom 93 that it is desirable usually to dispose the frame 10 in its rear position, which is done by attaching the hitch pin 19 in the front hole 15. With this arrangement, the gauge wheels 57 are disposed in their narrow setting, and preferably in their forward position laterally of the rear tractor wheels, so that the wheels will not run on the freshly plowed soil turned on the previous round.

Figure 10:
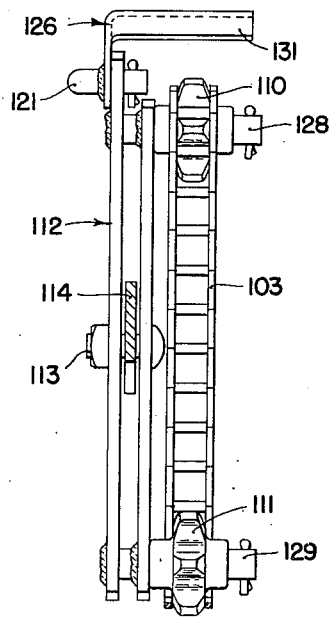
Figure 10 is a view taken generally along the line 10—10 of Figure 9.
Figure 11:
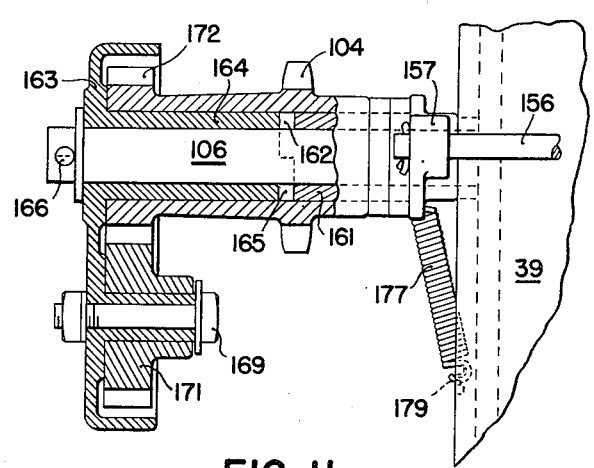
Figure 11 is a fragmentary section taken generally along the line 11—11 of Figure 9.

Referring now more particularly to Figures 9–11, the driving mechanism particularly adapted to accommodate longitudinal movement of the implement frame relative to the tractor comprises a driving sprocket 101 fixed to each axle shaft, each sprocket 101 being of the two-part separable type to facilitate connecting and disconnecting the same from the associated driving axle. A sprocket chain 103 is trained about the driving sprocket 101 and extends generally rearwardly where it passes around a sprocket pinion 104. The sprocket pinion 104 is mounted for rotation about the axis of a stub shaft 106 which is fixedly secured to a stationary part of the support for the adjacent seed can 36. The mechanism for transmitting the drive from the sprocket 104 to the seeding shaft 41 will be described below. According to the present invention means is provided for automatically taking up the slack in the chain 103 when the implement frame 10 is in a forward position and increasing the effective length of the sprocket chain 103 when the implement frame 10 is moved rearwardly, either by disposing the frame in a rearward position, as by placing the pivot 19 in the forward opening 15, or by the yielding of the cushioned springs 22, or both. Such automatically operable compensating means consist of a pair of idler sprockets 110 and 111, over which the lower bight of the chain 103 is trained, which are mounted for rotation on the opposite ends of a link member 112 swingably mounted, as by a pivot bolt 113, on the outer end of a rearwardly extending bracket 114. The latter is secured to the rear side of the adjacent rear axle housing extension and therefore moves, relative to the implement frame 10, with the tractor 1. The disposition of the sprocket chain 103 about the idler sprockets 110, 111 is such that swinging movement of the link 112 in one direction serves to increase the effective length of the chain 103 while swinging movement of the link 112 in the other direction serves to decrease the effective length of the chain 103. In order to control the movement of the link 112 so as to increase or decrease the effective length of the chain 103 to correspond to the position of the implement frame relative to the tractor, a controlling member, indicated in its entirety by the reference numeral 116, is connected between one end of the link 112 and a part on the frame 10. The member 116 comprises a sleeve 117 in the rear end of which a rod 118 is fixed and has one end bent laterally so as to enter and be secured in an opening 119 in the sector 80. The rod 118 extends only a short way in the tubular member 117, and the forward end of the latter telescopically receives a relatively shiftable rod member 121. The rear end of the latter is slidably disposed in the sleeve 117 and carries an adjustable collar 122 between which and the forward end of the tubular member 117 a spring 123 is disposed. The forward end of the rod member 121 is bent laterally and extended through a chain guard 126 and through the adjacent portion of the upper end of the swinging link member 112. The latter preferably consists of two strap members suitably connected together, as by being welded, in laterally spaced apart relation to a pair of studs 128 and 129 which serve as bearing supports for the idler sprockets 110 and 111. The chain guard 126 is formed with a curved hood section 131 which is normally disposed above the upper idler sprocket 110 and serves the purpose of preventing the upper bight or run of the driving sprocket chain 103 from inadvertently falling down and becoming entangled on the idler sprocket 110 or adjacent parts. The pivots 113, 119, 128, and 129 are so arranged that when the frame 10 moves, or is moved, rearwardly relative to the tractor 1. the effective length of the sprocket chain 103 is automatically increased to correspond to the new position of the frame. Specifically, if, for example, the frame 10 is moved two inches to the rear, then the upper idler sprocket 128 is moved also two inches to the rear while the lower idler sprocket 111 is moved approximately two inches in a forward direction. This, of course, increases the entire peripheral length of the chain 103 by an amount equal substantially to four inches, but since the chain 103 is looped about the driven sprocket pinion 104, which is carried by the implement, a movement of two inches of the latter requires an increase of four inches in the length of the chain 103. Thus, by virtue of the structure just described, the chain 103 is automatically maintained at exactly the effective length required for any given position of the implement frame relative to the tractor, and this is accomplished without undue slack in the chain 103 at any time. The spring 123 serves to maintain a slight amount of tension in the chain at all times and takes care of minor irregularities. The tension of the spring 123 may be adjusted by setting the setscrew collar 122 in different positions, as desired.

Another feature of this invention, having particularly to do with an implement construction in which the frame may take several different longitudinal positions relative to the tractor, is the provision of means for automatically disengaging the driving connections, just described, from the seeding shaft when the implement frame 10 is raised into its inoperative or transport position. To this latter end, the tractor 1 is provided with a conventional power-lift unit 140 which contains mechanism adapted when tripped to move a transverse rock shaft 141 through a given angular displacement. Fixed to each end of the rock shaft 141 is a power-lift arm 143, to which an arm extension 144 is pivoted, as at 145. The main arm 143 carries an adjustable stud 146 which is adapted to engage the arm extension 144 and, after taking up the lost motion between the arms 143 and 144, the power-lift mechanism, when actuated, acts through the arm extensions 144 and a pair of links 147 which extend downwardly from the arms to the implement frame 10, to raise the implement frame and lift the tools 30 or the like out of engagement with the ground.

As mentioned above, according to the present invention means is provided for automatically disengaging the driving connection when the implement frame is raised, and preferably said means is actuated from the power-lift arms 143. To this end, a bracket 150 is fixed to each power-lift arm 143 and is apertured to pivotally receive the forward end of the rod 151. The latter carries a setscrew collar 152 and has its rear end telescopically received in the forward end of a tubular member 154. The rear end of the tubular member 154 carries a rod 155, the rear end 156 of which is bent laterally and overlies the plate 39. extending laterally outwardly thereof as best shown in Figure 9. To effect the actual disconnection of the drive, the rear end 156 of the rod 155 is connected to the outer end of an arm member 157 that is rockably mounted on the fixed stub shaft 106. The arm member 157 includes a hub section 161 that has one or more axially directed lugs 162. Also, mounted on the stub shaft 106 for rocking movement thereon is a gear carrier 163 which also has a hub section 164 provided with one or more lugs 165 with which the lug or lugs 162 engage. A cotter key 166 serves to hold the arm member 157 and the gear carrier 163 in place, and the interengaging lugs 162 and 165 connect the two members whereby, when the part 154 is moved rearwardly, the gear carrier 163 is swung about its pivotal support on the stub shaft 106. The gear carrier 163 is provided with a pivot 169 on which a gear 171 is journaled. The gear 171 meshes with a gear section 172 which is formed preferably as an integral part with the driven sprocket pinion 104. Thus, when the arm member 157 is swung forwardly, the idler gear 171 is swung upwardly. The laterally inner end of the feeding shaft 41 carries a gear 175 that is connected, through conventional slip clutch mechanism 176, with the feeding shaft 41. Therefore, in the forward position of the arm member 157, the gears 171, 172 establish a driving connection with the seeding shaft 41, and in the rear position of the arm member 157 the driving connection is interrupted. The member 154 is moved forwardly for establishing the driving connection by suitable yielding means, such as a spring 177 which at one end is connected with a lug 178 on the arm member 157 and a fixed point on the implement, as indicated at 179. The member 154 is moved rearwardly to disengage the drive as the implement is raised, by virtue of the fact that the bracket 150 is disposed below the axis of movement of the rock shaft 141; therefore, when the arms are swung upwardly to raise the implement, the bracket 150 moves rearwardly, causing the setscrew collar 152 to engage the forward end of the member 154 and shift the latter rearwardly, thereby disengaging the drive.

It will be noted that by virtue of the telescopic connection between the rod 151 and the member 154, the frame 10 is free to shift rearwardly relative to the setscrew collar 152 at any time, the length of telescopic connection between these parts being sufficient to accommodate the maximum rearward movement of the implement frame relative to the tractor without permitting the parts to become disengaged. Thus, when the cushioned springs 22 yield and permit the implement frame 10 to shift rearwardly, said movement is accommodated automatically by the throw-out connections just described, if when the tools are raised out of engagement with the ground, the cushioned hitch springs 22 will automatically return the implement frame 10 to its forward position thereby bringing the front end of the member 154 close to the setscrew collar 152 whereby the lifting movement of the power-lift arm will therefore shift the member 154 rearwardly to disengage the drive. In other words, the hitch spring 22 will automatically return the implement to a position when the tools are raised so that the raising motion of the power-lift arms may be utilized to disengage the drive. The construction just described also accommodates placing the implement frame 10 in different positions relative to the tractor, as by having the implement frame disposed in a rearward position. Thus, if the pivot 19 should be placed in the forwardmost hole 15 of the implement frame 10, then all that it is necessary to do to adjust the throw-out mechanism to the new position of the implement frame is to shift the setscrew collar 152 rearwardly to a new position, such that actuation of the power-lift arms will cause the collars 152 to engage the associated members 154.

The throw-out mechanism at each side of the tractor is substantially identical and therefore further description is unnecessary.

Mention above was made regarding the use of various numbers of tools and disposing them in different positions laterally along the tool bar 13. When operating in trashy ground, with either sweeps or lister bottoms but more particularly with the latter, it is frequently desirable to use rolling colters for cutting through the trash to facilitate working the ground, and as a feature of this invention, particularly adapted for use with tools that are laterally shiftable to various positions, as just mentioned, I have disclosed in Figures 12 and 13 an improved form of colter support that accommodates shifting of the tool beams to different lateral positions.

Referring now to Figures 12 and 13, the lister beam 31 shown in detail in these figures includes, besides the foot pieces 32 mentioned above, a U-shaped member 201 that comprises the principal part of the beam. The member 201 includes side portions 202 and 203 which, adjacent their upper portions, are provided with a plurality of aligned apertures 205 in any one pair of which a pivot bolt 206 is disposed. The central portion 207 of the member 201 is also provided with a pair of apertures 208 in which vertically disposed clamping bolts 209 are disposed. These bolts receive a cap 210 which is normally disposed on the upper side of the tool bar 13. The member 201 is provided with a V-shaped notch, as indicated at 212, which is formed by a V-shaped part 213 that is welded or otherwise fixed to the central and side portions of the member 201. The cap 210 is also provided with a V-shaped notch 214, so that when the bolts 209 are tightened the lister beam 31 is firmly and rigidly clamped to the tool bar 13.

The rolling colter is indicated by the reference numeral 215 and is mounted upon suitable journal supports between a pair of colter arms 216 and 217. These arms preferably consist of right and left hand angle members bent so as to extend downwardly and forwardly at their front ends, as best shown in Figure 12. The rear ends of the colter arms 216 and 217 are apertured so as to receive the pivot bolt 206. A colter arm support 220 is provided to reenforce and strengthen the connection between the colter and the beam 31 to which it is connected and on which it is supported. The colter arm support consists of a generally L-shaped casting having a depending portion 221 arranged to extend downwardly between the two colter arms 216 and 217. The vertical flanges of the latter are apertured to receive a pair of clamping bolts 223, which bolts pass on opposite sides of the depending portion 221. The rear end of the casting 220, which is generally U-shaped in cross section at this point, is apertured, as at 224 (Figure 3), to receive the lower end of the forward clamping bolt 209. The width of the rear end of the colter arm support 220 is substantially the same as the distance between the inner faces of the lister beam sides 202 and 203, and thus when the clamping bolt 209 is tightened the colter arm support 220 is firmly and rigidly secured to the lister beam so as to form a part thereof. Also, the clamping bolts 223 firmly and rigidly fix the colter arms 216 and 217 to the colter arm support 220. This construction therefore provides a firm and rigid support for the rolling colter 215, and further, said support is movable laterally with the associated lister beam 31 so that the colter is always retained in exactly the proper position. It will be seen particularly from Figure 12 that when the clamping bolts 209 are loosened the lister beam 31 and the colter may be shifted laterally to any desired position without disturbing the relation between the colter 215 and the lister bottom 93.

The combination of the tillage tool and the adjustable crank axles for the gauge wheels, together with the rolling colter support and other related features, form the subject matter of and are claimed in a divisional application, Serial No. 489,583, filed June 2, 1943.

The operation of the implement described above is substantially as follows:

When employed as a four-row machine, the tools, whether sweeps or lister bottoms, will be spaced on opposite sides of the vertical longitudinal planes of the tractor rear wheels. Therefore, the frame 10 may be disposed in a forward position, as shown in Figure 1, disposing the pivot pin 19 in the rear hole 15. If sweeps are used, as shown in Figure 1, it is preferable to have the gauge wheels disposed rearwardly, since it is not desired to have the wheels run on the tops of the loose beds. By disposing the gauge wheels rearwardly, the gauge wheel axle castings 51 are spaced along the tool bar 13 so as to place the gauge wheels 51 substantially directly behind the rear tractor wheels 7 so they run in the wheel tracks and in the bottoms of the previously formed furrows. If, however, lister bottoms of the moldboard type are employed to form a four-row machine, the frame 10 may be disposed in its forward position, but the gauge wheels would preferably be disposed, not in a rearward position as shown in Figures 1-3, but in a forward position, preferably immediately in front of the laterally outermost lister bottoms, as indicated in dotted lines in Figure 1.

The machine may be arranged as a three-row implement by disposing the tools in the manner shown in Figures 7 and 8. In this case, since there is a tool immediately behind each rear tractor wheel, it is preferable to have the frame 10 disposed in its rearward position, as shown in Figure 7, so that there is ample clearance between the tools and the rear wheels. The rearward disposition of the frame 10 does not affect the driving connections between each driving axle and any associated driving mechanism carried by the implement frame, and as described above, the yielding of the cushioning springs in the hitch, as when encountering field obstructions and the like, will likewise not affect the driving connections. If, as shown in Figures 7 and 8, lister bottoms of the moldboard type are used, the gauge wheels preferably are disposed in their forward position and in their narrow setting, so as to place the gauge wheels as close as possible to the lister bottoms. It is also possible with the present implement to conveniently employ two bottoms, as shown in dotted lines in Figure 8, in which case the rear tractor wheels are placed in their laterally inward positions, and the gauge wheels are disposed in their forward position with a narrow setting and spaced along the tool bar 13 as closely as possible to the rear tractor wheels. This is done so that on the return trip neither the tractor wheel nor the gauge wheel at the forward side of the outfit will run on the loose ground thrown up by the landward lister bottom on the previous round. The driving connections are arranged, as described above, to accommodate rearward movement of the implement frame relative to the tractor, and while I have shown and described two driving connections, one at each side of the tractor, it will be understood that only one driving unit may be used if the two seeding shafts are connected together. Also, I have described above the manner in which the throw-out mechanism accommodates different longitudinal positions of the implement frame, as when the cushioned springs yield or when the hitch connection is arranged to dispose the implement frame in different longitudinal positions. The feature of the present invention in which the frame may be hitched to the tractor in any one of several longitudinal positions is useful, not only to accommodate different kinds and spacings of tools but also enables any one particular implement to be attached to different sizes of tractors.

While I have shown and described above a preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. The combination with a tractor having means from which power may be taken, of an implement having a mechanism adapted to be driven from said means, hitch means for connecting said implement with the tractor and arranged to accommodate generally longitudinal movement of the implement relative to the tractor, a driving connection between said power means and said mechanism, and means responsive to the movement of the implement relative to the tractor and connected with the latter and the implement for changing the effective length of said driving connection to correspond to the position of the implement relative to the tractor.

2. The combination with a tractor having means from which power may be taken, of an implement having mechanism adapted to be driven from said means, spring cushioned hitch means for connecting said implement with the tractor and arranged to permit the implement to move generally longitudinally rearwardly, relative to the tractor, a driving connection between said power means and said mechanism, and means responsive to movement of the implement relative to the tractor and connected with the latter and the implement for changing the effective length of said driving connection when said spring cushioned hitch means yields and permits the implement to move rearwardly relative to the tractor.

3. The combination with a tractor having means from which power may be taken, of an implement having mechanism adapted to be driven from said means, hitch means for connecting said implement with the tractor at any one of a plurality of positions generally longitudinally of the tractor, a driving connection between said power means and said mechanism, and means responsive to movement of the implement, relative to the tractor, to a different longitudinal position, said last mentioned means being connected with the tractor and the implement and operative to change the effective length of said driving connection to correspond to the new position of the implement relative to the tractor.

4. The combination wih a tractor having means from which power may be taken and an implement raising part movable on the tractor, of an implement having mechanism adapted to be driven from said power means, spring cushioned hitch means connecting said implement with the tractor and arranged to permit the implement to move rearwardly of the tractor a limited amount, a driving connection between said power means and said mechanism, means responsive to the movement of the implement relative to the tractor when said spring cushioned hitch means yields, said means being connected with the tractor and implement and operative to change the effective length of said driving connection to correspond to the change in the position of the implement relative to the tractor, means whereby said implement raising part is connected to raise said implement relative to the tractor to an inoperative position, and means operatively connected with the lifting part on the tractor for interrupting said driving connection when said implement is raised, said interrupting means including relatively movable parts accommodating movement of the implement relative to the tractor when the implement is in its lowered or operative position.

5. The combination with a tractor having an axle shaft, of an implement having mechanism adapted to be driven from said axle shaft, hitch means connecting said implement to the tractor and arranged to accommodate generally longitudinal movement of the implement relative to the tractor, whereby the position of said mechanism relative to said axle shaft varies, a driving connection between said axle shaft and said mechanism comprising a sprocket on said shaft, a unit for driving said mechanism including a sprocket and a chain trained over said sprockets, and means responsive to the movement of the implement relative to the tractor for changing the effective length of said chain to correspond to the position of the implement relative to the tractor.

6. In a tractor-mounted implement, frame means movably connected with the tractor, a driven sprocket mounted for rotation on said frame, a driving sprocket on the tractor, a driving chain trained around said sprockets, a swinging part pivotally mounted on the tractor, said chain being trained over said part whereby swinging movement of the latter changes the effective length of said chain, and means connected between said part and said frame means whereby movement of said implement relative to the tractor causes said part to swing and change the effective length of the driving chain to correspond to the change in the position of the implement relative to the tractor.

7. In combination, a tractor having a lifting arm, an implement movably connected with the tractor and operatively connected with said arm whereby the latter is adapted to raise and lower the implement, said implement having operative mechanism, a swingably mounted means on the implement and movable into and out of a position for driving said mechanism, and a link operatively connected with said lifting arm and said swingable means, whereby when said arm is operated to raise said implement, said swingable means is moved into a position disconnected from said implement mechanism.

8. The invention as defined in claim 7, further characterized by said swingable means including a gear carrier and a driving gear mounted on said swinging gear carrier coincidental with the axis of swinging movement thereof, and means for driving said gear from an axle shaft of said tractor.

9. In combination, a tractor having a lifting arm, an implement connected with the tractor and operatively connected with said arm whereby the latter is adapted to raise and lower the implement, said implement having mechanism to be driven from the tractor, disconnectible means for driving said mechanism, comprising a pivot carried by said implement, an arm and a swingable gear carrier mounted for rocking movement on said pivot, means connecting said arm and gear carrier whereby said arm swings said carrier, a driving gear mounted for rotation about the axis of said pivot, a second gear driven from the first gear and mounted on said gear carrier at a distance from the axis of said first gear, whereby the swinging movement of said carrier is adapted to shift the second gear into and out of driving connection with said implement mechanism, and means for driving said first gear.

10. In combination, a tractor having a lifting arm, an implement connected with the tractor and operatively connected with said arm whereby the latter is adapted to raise and lower the implement, said implement having mechanism to be driven from the tractor, disconnectible means for driving said mechanism, comprising a stud carried by said implement, an arm and a swingable gear carrier mounted for rocking movement on said stud, means connecting said arm and carrier whereby said arm swings said carrier, a driving gear mounted on said carrier for rotation about the axis of said stud, a second gear driven from the first gear and mounted on said gear carrier at a distance from the axis of said first gear, whereby swinging movement of said carrier is adapted to shift the second gear into and out of driving connection with said implement mechanism, and means operable from the tractor for swinging said arm to shift said second gear into and out of driving connection with said implement mechanism.

11. In combination, a tractor having a lifting arm, an implement connected with the tractor and operatively connected with said arm whereby the latter is adapted to raise and lower the implement, said implement having mechanism to be driven from the tractor, disconnectible means for driving said mechanism, comprising a stud carried by said implement, an arm and a swingable gear carrier mounted for rocking movement on said stud, means connecting said arm and gear carrier whereby said arm swings said carrier, a driving gear mounted on said carrier for rotation about the axis of said stud, a second gear driven from the first gear and mounted on said gear carrier at a distance from the axis of said first gear, whereby swinging movement of said carrier is adapted to shift the second gear into and out of driving connection with said implement mechanism, said tractor having means for raising and lowering at least a portion of the implement relative thereto, and a connection between said last mentioned means and said arm for swinging said second gear into and out of connection with said mechanism when said raising and lowering means on the tractor is operated.

12. In a tractor mounted implement in which the implement includes ground engaging means and is yieldingly connected with the tractor whereby said implement is capable of limited movement rearwardly of the tractor when said ground engaging means encounters an obstruction or the like, and in which said implement includes operative mechanism movable rearwardly when said ground engaging means move rearwardly, the combination of a driving connection between said mechanism on the implement and a driving part of the tractor, which driving connection is constructed and arranged to accommodate rearward movement of the implement relative to the tractor, means including a swingably mounted arm on the implement for disengaging said driving connection, a movable portion on the tractor for operating said disengaging means, and a pair of telescopically associated parts, one connected with said arm and the other connected with said movable part on the tractor, said telescopically associated parts accommodating rearward movement of the implement relative to the tractor.

13. In a tractor mounted implement, in which a part on the implement is adapted to be operated by a part on the tractor and in which the implement is connected with the tractor by yielding means, an operative connection between said parts comprising a first member connected with the part on the implement, a second member connected with the part on the tractor, and means connecting said members whereby relative movement therebetween in one direction is prevented and relative movement in the other direction is accommodated, said last mentioned means being arranged so that when said implement is in a normal position, relative to the tractor, the operation of said part on the tractor acts through said members to operate the part on the implement, said members being relatively movable in said other direction to accommodate movement of the implement relative to the tractor when said yielding means, connecting the implement with the tractor, yields.

14. In an agricultural implement, a part to be driven, a driving part, relatively displaceable supports carrying said parts, sprockets operatively connected with said parts, a sprocket chain trained over said sprockets, means movable relative to both of said parts for tensioning said chain, and means connected between said movable tensioning means and one of said displaceable supports whereby movement of one relative to the other shifts the position of said tensioning means.

15. In an agricultural implement, a supporting frame, an implement frame, a part on the latter adapted to be driven, a driving part therefor on said supporting frame, sprockets operatively connected with said parts, a sprocket chain trained over said sprockets, means movably mounted on one of said frames and movable relative to both of said parts for tensioning said chain, and means connected between asid tensioning means and the other frame for adjusting said tensioning means.

16. The combination with a tractor having a transversely disposed drive shaft from which power may be taken, of an implement having a mechanism adapted to be driven from said shaft, hitch means for connecting said implement with the tractor and arranged to accommodate generally longitudinal movement of the implement relative to the tractor, a transversely disposed driven shaft journaled on said implement and connected with said mechanism, a pair of driving and driven members fixed to said drive and driven shafts, respectively, in fore and aft alignment, a flexible endless power transmitting member trained over said driving and driven members, and means responsive to the movement of said implement relative to the tractor and connected with the latter and the implement for changing the effective length of said power transmitting member to correspond to the position of the implement relative to the tractor.

17. The combination with a tractor having a transversely disposed drive shaft from which power may be taken, of an implement having a mechanism adapted to be driven from said shaft, hitch means for connecting said implement with the tractor and arranged to accommodate generaly longitudinal movement of the implement relative to the tractor, a transversely disposed driven shaft journaled on said implement and connected with said mechanism, a pair of driving and driven members fixed to said drive and driven shafts, respectively, in fore and aft alignment, a flexible endless power transmitting member trained over said driving and driven members and having an appreciable amount of slack therein, and means responsive to the movement of said implement relative to the tractor and connected with the latter and with the implement for taking up the slack in said power transmitting member to correspond to the position of the implement relative to the tractor.

18. In a tractor mounted implement having mechanism to be driven from the tractor, disconnectible means for driving said mechanism, comprising a stud carried by said implement, an arm and a swingable gear carrier mounted for rocking movement on said stud, means connecting said arm and gear carrier whereby said arm swings said carrier, a driving gear mounted on said carrier for rotation about the axis of said stud, a second gear driven from the first gear and mounted on said gear carrier at a distance from the axis of said first gear, whereby swinging movement of said carrier is adapted to shift the second gear into and out of driving connection with said implement mechanism, said tractor having means for raising and lowering at least a portion of the implement relative thereto, a connection between said last mentioned means and said arm for swinging said second gear into and out of connection with said mechanism when said raising and lowering means on the tractor is operated, and spring cushioned means operatively connecting said implement with the tractor and accommodating rearward movement of the implement when the latter strikes an obstruction or the like, said connection including relatively moving parts operative to accommodate movement of the implement relative to the tractor when said spring cushioned hitch yields, the latter serving to move said implement, when it is in its raised position, to a position relative to the tractor whereby the relatively movable parts of said connection are in a position operative to disengage the drive to said implement mechanism.

19. The combination defined by claim 17, further characterized in that said means responsive to relative movement between said tractor and implement is extensible and is provided with resilient means for urging the same toward extended position.

20. The combination defined by claim 17, further characterized in that said last named means includes an arm pivoted on one element of said tractor and implement combination and having a part in engagement with said power transmitting member, and link means connecting said pivoted arm with the other element of said tractor and implement combination.

21. The combination defined by claim 17, further characterized in that said last named means includes an arm pivoted on one element of said tractor and implement combination and having a part in engagement with said power tarnsmitting member, an extensible link connecting said pivoted arm with the other element of said tractor and implement combination, and resilient means for urging said link toward extended position.

22. The combination with a tractor having means from which power may be taken, of an implement having a mechanism adapted to be actuated from said means, hitch means for connecting said implement with the tractor and arranged to accommodate relative movement of the implement relative to the tractor, an operating connection between said power means and said mechanism, movable means for changing the effective length of said operating connection to correspond to the position of the implement relative to the tractor, and means responsive to the movement of the implement relative to the tractor and connected with the latter and the implement for actuating said movable means.

WALTER H. SILVER.